US009055144B2

United States Patent
Yang et al.

(10) Patent No.: US 9,055,144 B2
(45) Date of Patent: Jun. 9, 2015

(54) HANDLE FOR HANDHELD TERMINAL

(71) Applicants: Jinrong Yang, Shanghai (CN); Ramzi Khalil Maalouf, Chevy Chase, MD (US)

(72) Inventors: Jinrong Yang, Shanghai (CN); Ramzi Khalil Maalouf, Chevy Chase, MD (US)

( * ) Notice: Subject to any disclaimer, the term of this patent is extended or adjusted under 35 U.S.C. 154(b) by 0 days.

(21) Appl. No.: 13/961,670

(22) Filed: Aug. 7, 2013

(65) Prior Publication Data
US 2014/0146193 A1    May 29, 2014

(30) Foreign Application Priority Data

Nov. 28, 2012  (CN) .......................... 2012 2 0638696

(51) Int. Cl.
H04N 5/232 (2006.01)
H04M 1/04 (2006.01)
H04N 5/225 (2006.01)
H04M 1/725 (2006.01)
H04W 88/02 (2009.01)

(52) U.S. Cl.
CPC ............. *H04M 1/04* (2013.01); *H04N 5/23203* (2013.01); *H04N 5/2252* (2013.01); *H04N 5/232* (2013.01); *H04M 1/7253* (2013.01); *H04W 88/02* (2013.01)

(58) Field of Classification Search
USPC ......... 455/419, 552.1, 556.1, 557, 90.1–90.3, 455/550.1, 575.1, 575.3, 575.4; 709/203, 709/227
See application file for complete search history.

(56) References Cited

U.S. PATENT DOCUMENTS

| 5,872,565 | A | 2/1999 | Greaves et al. |
| 6,417,797 | B1 | 7/2002 | Cousins et al. |
| 6,965,400 | B1 | 11/2005 | Haba et al. |
| 6,976,111 | B1 | 12/2005 | Mills et al. |
| 7,404,001 | B2 | 7/2008 | Campbell et al. |
| 7,412,259 | B2 | 8/2008 | Yoo et al. |
| 8,244,299 | B1 | 8/2012 | Bishop |
| 8,385,974 | B1 | 2/2013 | Bishop |
| 8,577,412 | B1 | 11/2013 | Bishop |
| 8,832,287 | B2 | 9/2014 | Yang et al. |
| 8,842,155 | B2 | 9/2014 | Border et al. |
| 8,915,660 | B1 | 12/2014 | Ben Yehuda et al. |
| 2002/0024506 | A1 | 2/2002 | Flack et al. |
| 2002/0044225 | A1 | 4/2002 | Rakib |
| 2002/0183102 | A1 | 12/2002 | Withers et al. |
| 2009/0185040 | A1 | 7/2009 | Yang et al. |
| 2012/0081500 | A1 | 4/2012 | Border et al. |
| 2013/0005401 | A1 | 1/2013 | Rosenhan et al. |
| 2013/0233986 | A1 | 9/2013 | Rasheta |
| 2014/0093229 | A1* | 4/2014 | Lecuna Aguerrevere ..... 396/420 |
| 2014/0146193 | A1 | 5/2014 | Yang et al. |

OTHER PUBLICATIONS

Zacuto, "iPhone 3gs Accessories Video", Jul. 13, 2009, pp. 1-8.

* cited by examiner

*Primary Examiner* — Sam Bhattacharya
(74) *Attorney, Agent, or Firm* — Stephen A. Mason; Meyertons, Hood, Kivlin, Kowert & Goetzel, P.C.

(57) ABSTRACT

A handle for a handheld terminal includes a first interface module, a first key module, a first power supply module, and a base handle module. The handle couples with the handheld terminal. The handle makes a wireless connection with the handheld terminal the first interface module or a wired connection with the handheld terminal via the first interface module. The first key module includes one or more user operation command keys. The first power supply module supplies power for the handle. The handle is operable with one hand.

17 Claims, 2 Drawing Sheets

HANDLE FOR HANDHELD TERMINAL

This appication claims priority to Chinese Application No. 201220638696.7, filed Nov. 28, 2012, titled "One-Hand Manipulation Handle for Hand-Held Terminal."

BACKGROUND

1. Field

The present disclosure relates to a handle, in particular to a handle for mobile phone or other handheld terminals that can be used in taking photographs and creating videos.

2. Description of the Related Art

Handheld terminals, such as mobile phones, are becoming ever more widely used. With the advances in science and technology, the quality of camera technology in handheld terminals taking photos and creating video has improved.

As mobile phone photos or videos have become easier and convenient for timely viewing, transfer and sharing, users of handheld terminals are inspired to take more photos or videos with their handheld terminals. For many people, the frequency of mobile phone shooting has exceeded that of photos taken using a conventional camera. However, a typical mobile phone camera may have features that are not optimized for photography. For example, many handheld terminals are characterized by inconvenient operation, such as poor gripping, and by poor shooting effects. Also, with some handheld terminals, it may be difficult to take photos or videos with one hand.

SUMMARY

Systems and methods are described herein for holding and operating handheld terminal devices, such as mobile phones. According to one embodiment, a handle for a handheld terminal includes a first interface module, a first key module, a first power supply module, and a base handle module. The handle couples with the handheld terminal. The handle makes a wireless connection with the handheld terminal the first interface module or a wired connection with the handheld terminal via the first interface module. The first key module includes one or more user operation command keys. The first power supply module supplies power for the handle. The handle is operable with one hand. In some embodiments, the handheld terminal is held in a chuck that adjusts to couple to the housing of the handheld terminal. In certain embodiments, the handle allows a user to operate a camera of a mobile phone remotely.

According to one embodiment, a method of using a handheld terminal includes coupling a handle to a handheld terminal comprising a camera, and operating one or more keys on the handle to control one or more operations on the camera.

Figure 1:
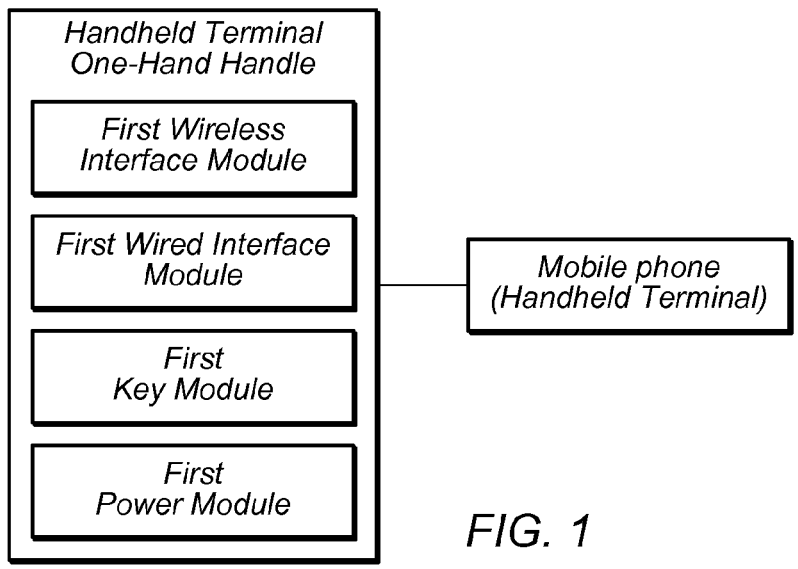
FIG. 1 is the modular structure diagram of a one-hand handle according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In some embodiments, a handheld terminal one-hand handle fixes (for example, secures or holds) a mobile phone or other handheld terminal via the handle, operates the mobile phone or handheld terminal shooting function via buttons on the handle. In certain embodiments, remote control operations can also be performed (for example, a non-fixed mode). Illustrative embodiments of a handle are described as below.

In some embodiments, a one-hand handle module include a first wireless interface module and/or the first wired interface module, a first key module, and a first power module. The one-hand handle has a wireless connection with the handheld terminal via the first wireless interface module or has a wired connection via the first wired interface module. The first key module is provided with a user operation command key. The first power supply module supplies work power for the one-hand handle.

A handle base module includes a transformable chuck, handle pillar, and handle tripod. The handle pillar includes a slot sliding plate, buttons, magnets and springs. The buttons and magnets are used to control the slot sliding plate.

When the slot sliding plate is pulled out to the appropriate length and placed in the handheld terminal device, the spring may lock the handheld terminal, fixes via the buttons and the magnets. The sliding of the slot is used to fix the handheld terminal after opening along with the chuck.

In some embodiments, a user operation command keys include one or more of a camera key, video key and zoom key, camera/video shift key and zoom key. The first wireless interface module may be WIFI or Bluetooth. The first interface module may be, in various embodiments, a USB interface or an iPhone interface connected with the handheld terminal.

The first key module may be available for users to input command. The first power supply module may include lithium-ion batteries, nickel-cadmium batteries, button batteries or dry batteries, which can be charged and discharged.

The gripping position of the one-hand handle may be equipped with anti-slip material or coating. The USB interface or iPhone interface may be positioned at the handheld terminal behind the handheld base module and the contact surface of the one-hand handle, or the USB interface or iPhone interface is at the side surface of handheld terminal, and can connect with the handheld terminal via the lead. The handheld terminal is mobile phone.

The one-hand handle may include a remote control of the mobile phone. The one-hand handle may have the following advantages (in a mobile phone for example): the handle may realizes the transformation from the behavior pattern of operating the mobile phone for taking pictures or videos to the behavior pattern of one-hand operating mobile phone, controlling the camera or video function of the handheld terminal, so that the handheld terminal is convenient and comfortable holding. The one hand handle may also provide stability and security.

Illustrative Embodiment

As shown in FIG. 1, it is a modular structure diagram of the one-hand handle of the utility model handheld terminal in the preferred embodiment, the one-handed handle is equipped with handle module and handle base module. The handle comprises of the first wireless interface module and/or the first wired interface module as well as the first key module and the first power module; the handle base comprises of chuck module, handle pillar module and handle foot stand module. The one-hand handle has connection with the handheld terminal via the first wireless interface module, or has wired connection via the first wired interface module.

Figure 2:
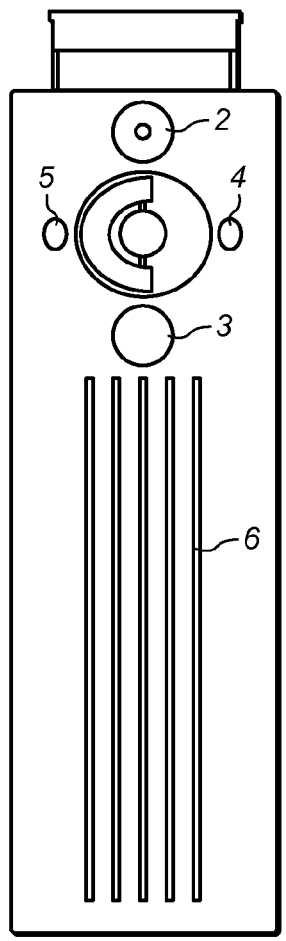
FIG. 2 is the front view illustrating a one-hand handle in one embodiment.
Figure 3:
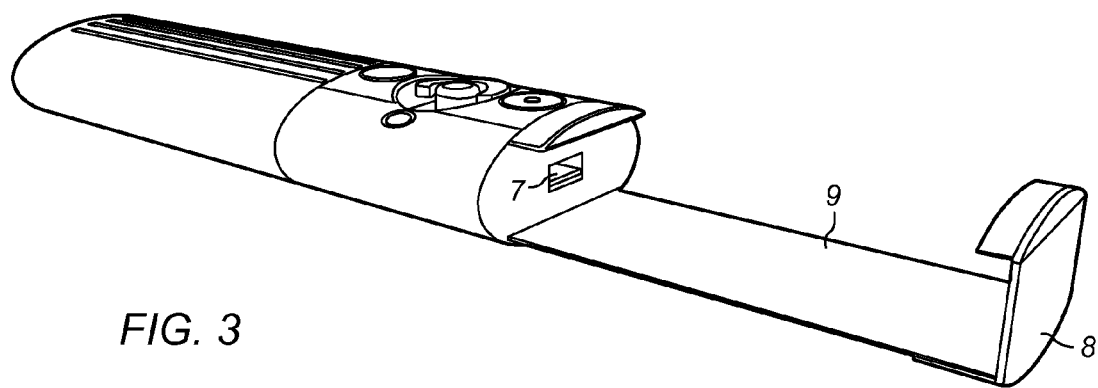
FIG. 3 illustrates the one-hand handle's slot sliding plate pulling state diagram in one embodiment.

As shown in FIG. 2 and FIG. 3, the handle base module comprises of transformable chuck 8, slot sliding plate 9, magnet and spring, the button 1, the magnet, spring, button are used to control the openness and closing of slot sliding plate 9 and the real-time position of the slot sliding plate 9. The slot sliding plate 9 fixes the handheld terminal along with the transformable chuck 8.

The first key module equips with the user operation command key. The first power supply module supplies work power for the one-handed handle. The gripping position of the one-hand handle is also equipped with anti-slip material or member. This embodiment may include slots, such as slot 6.

The first key module may be available for users to input commands. The user operation command keys may include a camera key, video key and zoom key, or camera/video shift key and zoom key, or combinations thereof. FIG. 2 shows an example arrangement of keys, including the camera key 2, camera/video shift key, first zoom key 4, and second zoom button 5. The first zoom key 4 and the second zoom key 5 may correspond to the objects with different focal lengths.

A wireless interface module may be, in various embodiments, WIFI or Bluetooth. An interface module may include a USB interface or I Phone interface connected with the handheld terminal.

In some embodiments, the first power supply module is lithium-ion batteries, nickel-cadmium batteries, button batteries or dry batteries, which can be charged and discharged.

As shown in FIG. 3, an interface (for example, USB or iPhone) is positioned at the handheld terminal behind the handheld base module and the contact surface of the one-hand handle. In one embodiment, interface 7 may be the interface connecting with an iPhone. In another embodiment, the USB interface or iPhone interface may be at the side surface of handheld terminal and can connect with the handheld terminal via the lead.

Figure 4:
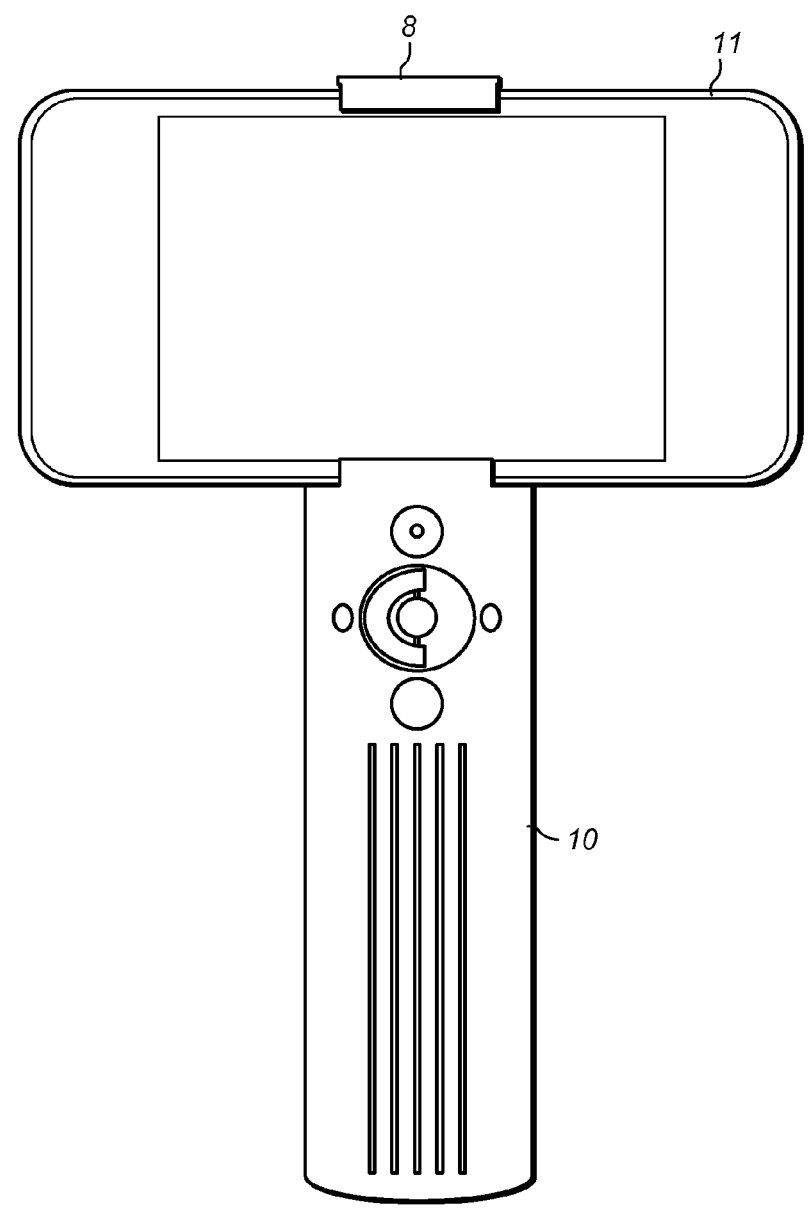
FIG. 4 illustrates a fixed mobile phone one-hand handle's usage state diagram in one embodiment.

In some embodiments, the handheld terminal being held by a handle is a mobile phone. FIG. 4 illustrates a mobile phone held in a chuck of a handle. One or more magnets, springs, and buttons of handle 10 may be used to control the opening and closing of slot sliding plate 9, and holding of handheld 11 in the chuck. The real-time position of the slot sliding plate 9, the slot sliding plate 9 fixes the handheld terminal along with the transformable chuck 8. After being positioned, the slot sliding plate 9 will not move up and down, thus one-hand operating the mobile phone command will become much easier.

In some embodiments, a one-hand handle can also be used as the remote control of the mobile phone.

The various methods as illustrated in the figures and described herein represent exemplary embodiments of systems and methods. The systems and methods may be implemented manually, in software, in hardware, or a combination thereof. The order of any method may be changed, and various elements may be added, reordered, combined, omitted, modified, etc. Additionally, various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A handle for a handheld terminal, comprising:
a first interface module;
a first key module;
a first power supply module;
a base handle module comprising a handle;
a sliding mechanism; and
one or more springs, the one or more springs coupled to the sliding mechanism;
wherein the handle is configured to couple with the handheld terminal via the sliding mechanism such that when the sliding mechanism is expanded and coupled to the handheld terminal, at least one of the one or more springs applies a force to hold the handheld terminal in place,
wherein the base handle module is configured to wirelessly connect with the handheld terminal via the first interface module,
wherein the first key module comprises one or more user operated command keys,
wherein the first power supply module is configured to supply power for the base handle module, and
wherein the base handle module can be held with one hand such that the one hand can operate one or more of the user operated command keys while the one hand is also holding the base handle module.

2. The handle of claim 1, wherein the base handle module comprises:
a transformable chuck;
a handle pillar; and
a handle tripod.

3. The handle of claim 1, wherein at least one user operated command key comprises a camera key, a video key, a camera/video shift key, or a zoom key.

4. The handle of claim 1, characterized in that the first interface module is a WIFI or Bluetooth enabled interface.

5. The handle of claim 1, wherein the first interface module is configured for a USB interface or an iPhone interface with the handheld terminal.

6. The handle of claim 5, wherein the USB interface or iPhone interface is positioned at the handheld terminal behind the base handle module and the contact surface of the handle, or the USB interface or iPhone interface is at the side surface of the handheld terminal and is configured to connect with the handheld terminal via a lead.

7. The handle of claim 1, wherein the first key module is positioned such that it is available for users to input a command.

8. The handle of claim 1, wherein the first power supply module comprises lithium-ion batteries, nickel-cadmium batteries, button batteries or dry batteries, and wherein the gripping position of the handle comprises an anti-slip material.

9. The handle of claim 1, wherein the handheld terminal is a mobile phone.

10. The handle of claim 9, wherein the handle is configured to operate as a remote control for the mobile phone.

11. A handle for a handheld terminal, comprising:
a first interface module;
a first key module;
a base handle;
a chuck configured to hold the handheld terminal wherein the chuck is spring-loaded such that the chuck holds the handheld terminal; and
wherein the based handle is configured to couple with the handheld terminal via the chuck,
wherein the base handle is configured to make a wireless connection with the handheld terminal via the first interface module, and
wherein the first key module comprises one or more user operated command keys.

12. The handle of claim 11, wherein the first key module is configured to control at least a camera operation, a video operation, a zoom operation, or a camera/video shift operation.

13. The handle of claim 11, further comprising a first power supply module configured to supply power for the base handle.

14. A handle for a mobile phone, the handle comprising:
a base handle;
a first power supply module coupled to the base handle and comprising one or more batteries;
a first interface module configured to make a wireless connection between the base handle and the mobile phone;
a first key module comprising:
  a camera key configured to control, via the first interface module, a camera operation or a video operation of the mobile phone;
  a first zoom key configured to control, via the first interface module, a first zoom operation of the mobile phone;
  a second zoom key configured to control, via the first interface module, a second zoom operation of the mobile phone; and
a sliding mechanism coupled to the base handle and configured to hold the mobile phone, wherein the sliding mechanism is spring-loaded such that the sliding mechanism holds the mobile phone when the sliding mechanism is in place relative to the handheld terminal.

15. The handle for the mobile phone as recited in claim 14, wherein the first interface module is configured to make a Bluetooth wireless connection between the base handle and the mobile phone.

16. The handle for the mobile phone as recited in claim 14, wherein the based handle acts as a remote control for the mobile phone such that the camera key, first zoom key and second zoom key remotely control, via the first interface module, respective operations of the mobile phone when the base handle is not fixed to the mobile phone.

17. The handle for the mobile phone as recited in claim 14, further comprising a base handle tripod.

* * * * *